March 25, 1952   C. L. SWIFT   2,590,280
TRANSMISSION
Filed Jan. 6, 1949
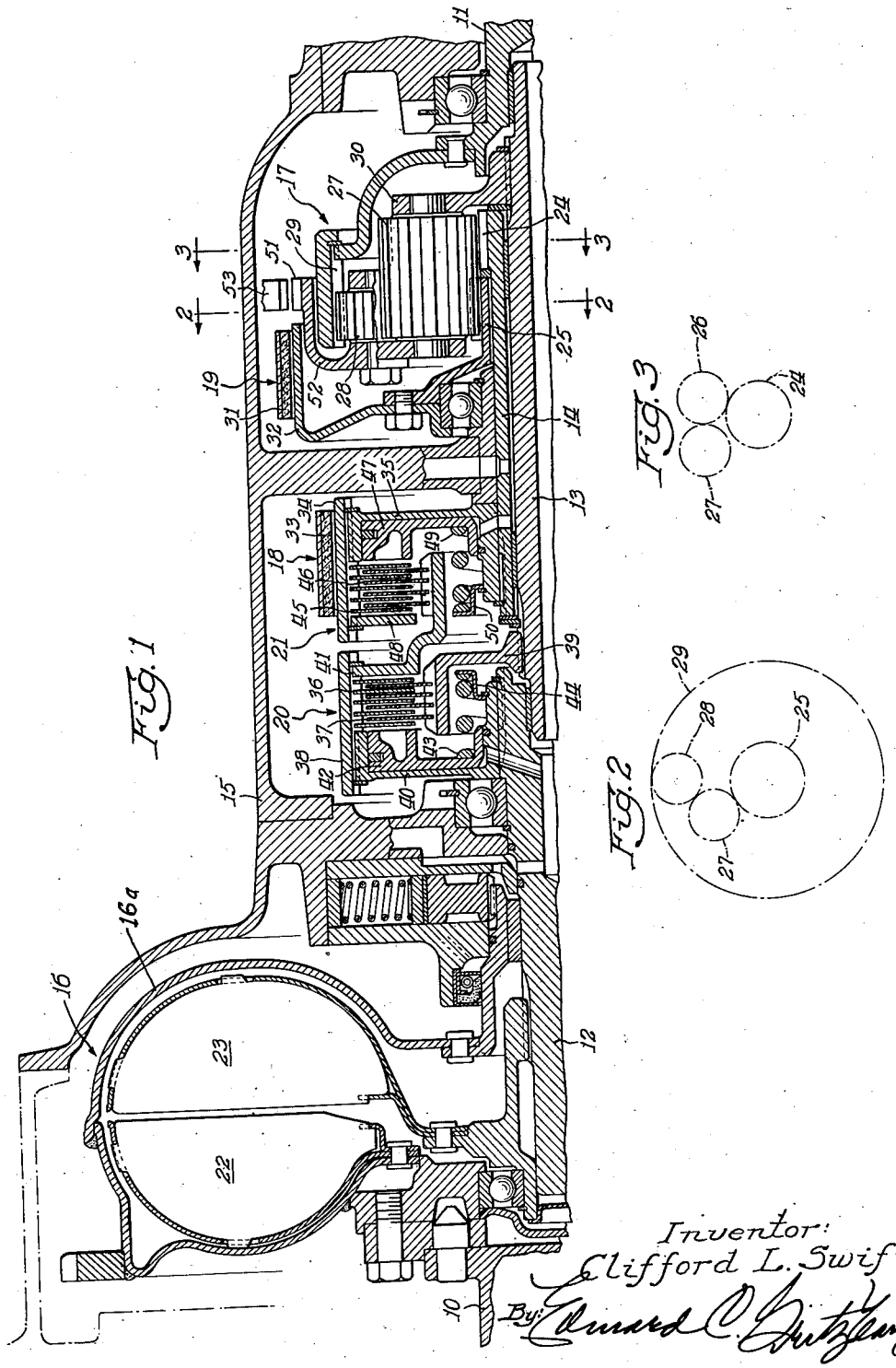
Inventor:
Clifford L. Swift Patented Mar. 25, 1952

2,590,280

UNITED STATES PATENT OFFICE 2,590,280

TRANSMISSION

Clifford L. Swift, Muncie, Ind., assignor to Borg-Warner Corporation, Chicago, Ill., a corporation of Illinois Application January 6, 1949, Serial No. 69,518

8 Claims. (Cl. 74—763)

My invention relates to transmissions and more particularly to transmissions for automotive vehicles.

It is an object of the invention to provide an improved gear set for such a transmission by means of which the driven shaft of the transmission may be driven in four forward drives of different ratio and may be driven in reverse drive with the use of only five engaging mechanisms.

It is a further object to utilize engaging mechanisms of the friction type for completing each of the forward drive power trains so that the transmsision may be power shifted between its various forward drives, that is, shifted without the necessity for the vehicle operator releasing the accelerator of the vehicle in order to initiate or complete the shift in speed ratio.

The invention consists of the novel constructions, arrangements and devices to be hereinafter described and claimed for carrying out the above stated objects and such other objects as will appear from the following description of a certain preferred embodiment illustrated in the accompanying drawing wherein:

Fig. 1 is a longitudinal, sectional view of a transmission embodying the principles of the transmission; and Figs. 2 and 3 are schematic sectional views taken on lines 2—2 and 3—3 respectively of Fig. 1.

Like characters of reference designate like parts in the several views.

Referring now to the drawing, the illustrated transmission comprises a drive shaft 10, a driven shaft 11, and intermediate shafts 12, 13 and 14. The shaft 10 is adapted to be connected with the driving engine (not shown) of the automotive vehicle in which the transmission is installed, and the driven shaft 11 is adapted to be connected to the driving road wheels (not shown) of the vehicle. The intermediate shafts 12 and 13 are in piloted relation with each other and with the driving and driven shafts and are rotatably disposed within a transmission casing 15 as illustrated.

The transmission comprises in general a fluid coupling 16, a planetary gear set 17, friction brakes 18 and 19 and friction clutches 20 and 21.

The fluid coupling 16 comprises a fluid casing or container 16a which is connected with the shaft 10 to be driven thereby, a vaned impeller 22 connected with the casing and drive shaft and a vaned rotor 23 which is splined onto the intermediate shaft 12. The fluid coupling 16 is of an ordinary construction and operates in accordance with the well-known principles of such devices and hence will not be further described in detail. Suffice it to say, the rotor 23 due to the fluid impinging thereon, which is given energy by the rotation of the impeller 22, is driven at a speed which becomes very nearly equal to that of the impeller 22 as the impeller increases in speed. The coupling 16 functions to provide a smooth drive therethrough from the shaft 10 to the shaft 12.

The planetary gear set 17 comprises a pair of sun gears 24 and 25, planet gears 26, 27 and 28, a ring gear 29 and a planet gear carrier 30. The sun gear 24 is formed on the shaft 14 which is journaled on the shaft 13, and the sun gear 25 is rotatably disposed on the shaft 14. The planet gear 27 is in mesh with the sun gear 25 and with the planet gear 28, and the planet gear 28 is also in mesh with the ring gear 29. The planet gear 26 is in mesh both with the planet gear 27 and also with the sun gear 24, and the planet gears 26, 27 and 28 are all rotatably mounted on the planet gear carrier 30, as shown.

The friction brake 19 comprises a friction band 31 adapted to engage a drum 32 which is fixed to the sun gear 25. The friction brake 18 comprises a brake band 33 which is adapted to engage a drum 34 fixed with respect to the shaft 14 by means of an intermediate member 35. Both of the bands 31 and 33 may be engaged with their respective drums by means of any suitable motors (not shown), preferably fluid pressure operated, acting on the bands.

The clutch 20 comprises clutch discs 36 and 37 which are respectively splined to a shell 38 and a hub 39. The shell 38 is fixed with respect to the shaft 12 by means of an intermediate annular member 40, and the hub 39 is splined on to the shaft 13. A backing plate member 41 is fixed within the shell 38, and a fluid pressure operated piston 42 is provided for frictionally engaging the clutch discs 36 and 37 and compressing them between the piston 42 and backing plate member 41. A compression spring 43 is provided for yieldably holding the piston 42 in its clutch disengaging position in which it is illustrated, and the spring is disposed between the piston and a ring 44 fixed on the intermediate member 40.

The clutch 21 comprises clutch discs 45 and 46 which are splined respectively within the drum 34 and on the member 41. A piston 47 is disposed within the member 35, and an opposite pressure plate 48 is fixed within the drum 34. The piston 47 is adapted to compress the discs 45 and 46 between the piston and pressure plate for engaging the clutch 21. A compression spring 49 is provided between the piston 47 and a ring 50 fixed on the member 35 for yieldably holding the piston 47 in its clutch disengaging position in which it is illustrated.

A brake is also provided for the carrier 30 which comprises sprag teeth 51 formed on a drum 52 fixed to the carrier and a sprag 53 movable into engagement with the teeth 51.

The illustrated transmission provides four speed ratios in forward drive and also a drive in reverse. All of these drives include the fluid coupling. Low speed forward drive is obtained by engaging the clutch 21 and the brake 19. The clutch 21 functions to connect the intermediate shaft 14 with the shaft 12 which is driven from the fluid coupling 16, and the brake 19 functions to hold stationary the sun gear 25 thereby rendering this gear the reaction element of the gear set 17. The drive is then from the drive shaft 10 and impeller 22, through the runner 23, the shaft 12, the members 40, 38, 41, the clutch 21, the members 34 and 35, the shaft 14, the gears 24, 26, 27, 28 and 29 to the driven shaft 11.

In order to shift to second speed drive, which allows the drive shaft 10 to decrease in speed relative to the speed of the driven shaft 11, the clutch 20 is engaged and the clutch 21 is disengaged, with the brake 19 remaining engaged. The drive in this speed ratio is the same as in low speed drive with the exception that the clutch 20 functions to drive the planet gear carrier 30 through the shaft 13 instead of the sun gear 24 being driven.

Third speed drive, which is a direct drive between the shafts 12 and 11, is obtained by disengaging the brake 19 and engaging the clutch 21, with the clutch 20 remaining engaged. The clutch 20 functions as before to drive the planet gear carrier 30, and the clutch 21 functions as in low speed drive to drive the sun gear 24. Since both the carrier 30 and the sun gear 24 are driven at the same speed, which is that of the shaft 12, the elements of the planet gear set 17 are then locked to rotate as a unit, and its ring gear and thereby the shaft 11 is driven at the same speed as the shaft 12.

Fourth speed forward drive, which is an overdrive, is obtained by engaging the brake 18 and disengaging the clutch 21, with the clutch 20 remaining engaged. The clutch 20 functions to drive the carrier 30 along with the shaft 12, and the brake 18 functions to hold the sun gear 24 stationary so that an overdrive of the ring gear 29 and thereby of the driven shaft 11 results.

Reverse drive is obtained by engaging the clutch 21 and engaging the sprag 53 with the teeth 51 on the member 52 fixed to the carrier 30 for holding the carrier 30 stationary. The clutch 21 connects the sun gear 24 and the shaft 12 causing the gear to be driven, and the net result is a drive in reverse of the ring gear 29 and driven shaft 11 at a reduced speed with respect to the shaft 12.

The transmission advantageously utilizes a gear set which provides four speed ratios in forward drive as well as a drive in reverse and is simple in construction and therefore economical of manufacture. The transmission advantageously includes friction engaging clutches and brakes for completing the various forward drive power trains, so that the transmission may be power shifted, that is, shifted simply by the engagements and disengagements of the various friction mechanisms without the necessity of the vehicle operator releasing the vehicle accelerator in order to initiate or complete a change in speed ratio.

I wish it to be understood that the invention is not to be limited to the specific structures, arrangements and devices hereinabove described, except only insofar as the claims may be so limited, as it will be apparent to those skilled in the art that changes may be made without departing from the principles of the invention.

I claim:

1. In a transmission, a planetary gear set comprising a ring gear, a sun gear, a first planet gear in mesh with said sun gear, a second planet gear in mesh with said ring gear and with said first planet gear, a second sun gear, a third planet gear in mesh with said first planet gear and with said second sun gear, a carrier for said planet gears, and means for causing a selected one of the gears of said planetary gear set to serve as a reaction member.

2. In a transmission, the combination of a drive shaft, a driven shaft, a planet gear set comprising a ring gear connected with said driven shaft, a sun gear, a first planet gear in mesh with said sun gear, a second planet gear in mesh with said first planet gear and with said ring gear, a second sun gear, and a third planet gear in mesh with said first planet gear and with said second sun gear, and a planet gear carrier, means for coupling said planet carrier in driving relation with said drive shaft, clutch means for connecting said drive shaft and said second sun gear and a brake for said first sun gear for completing a reduced speed power train between said shafts when it and said clutch are both engaged.

3. In a transmission, the combination of a drive shaft, a driven shaft, a planetary gear set comprising a ring gear connected with said driven shaft, a sun gear, a planet gear in mesh with said sun gear, a second planet gear in mesh with said first planet gear and a third planet gear in mesh with said ring gear and with said second planet gear, a brake for said sun gear, a carrier for said planet gears, and a clutch for connecting said planet gear carrier and said drive shaft to complete an overdrive power train between said shafts when it and said brake are both engaged.

4. In a transmission, the combination of a drive shaft, a driven shaft, a planetary gear set comprising a plurality of drive-transmitting and reaction elements, one of said elements being connected with one of said shafts, a low ratio reduced speed power train comprising a clutch for connecting a second element of said gear set with the other of said shafts and a brake for causing a third of said elements to serve as a reaction member of said gear set, a higher ratio reduced speed power train including a second clutch for connecting a fourth element of said gear set with said last-named shaft while said brake is engaged to cause said third element to serve as a reaction member for said planetary set, a one to one drive connection between said shafts being provided by engaging both said clutches, an overdrive power train between said shafts including one of said clutches for connecting the fourth element of the gear set with one of said shafts and a second brake for causing the second element of said planetary gear set to serve as a reaction member and a reverse power train between said shafts including said first named clutch and a brake for said fourth element of said gear set for causing this element to serve as a reaction member.

5. In a transmission, the combination of a drive shaft, a driven shaft, a planetary gear set comprising a pair of sun gears, a ring gear and a planet gear carrier, a clutch for connecting one of said sun gears with said drive shaft and a brake for causing the other of said sun gears to serve as a reaction member, whereby a low reduced ratio power train between said shafts may be established, a second clutch for connecting said planet gear carrier with said drive shaft whereby when said brake is engaged, a higher reduced speed power train is established between said shafts, a one to one drive being established between said shafts when both said clutches are engaged, a second brake for causing said first-named sun gear to serve as the reaction member of said planetary gear set whereby when said second-named clutch is engaged, an overdrive power train is established between said shafts and a third brake for said carrier for causing the carrier to serve as the reaction member of said planetary gear set whereby when said first named clutch is engaged, a reverse power train is established between said shafts.

6. In a transmission, the combination of a drive shaft, a driven shaft, a planetary gear set comprising a ring gear connected with said driven shaft, a sun gear, a planet gear in mesh with said sun gear, a second planet gear in mesh with said first planet gear and a third planet gear in mesh with said second planet gear and with said ring gear, a carrier for said planet gears, and a brake for causing said planet gear carrier to act as a reaction member and a clutch for connecting said sun gear with said drive shaft whereby a reverse drive between said shafts is established.

7. In a transmission, the combination of a drive shaft, a driven shaft, a planetary gear set comprising a ring gear connected with said driven shaft, a sun gear, a first planet gear in mesh with said sun gear, a second planet gear in mesh with said ring gear and with said first planet gear, a second sun gear, and a third planet gear in mesh with said second sun gear and with said first planet gear, a carrier for said planet gears, a brake for causing said first sun gear to serve as a reaction member for said planetary gear set and a clutch for connecting said second sun gear with said drive shaft whereby a low speed power train may be established between said shafts, a second clutch for connecting said planet gear carrier with said drive shaft whereby when said brake is engaged to cause said first sun gear to serve as a reaction member, a higher reduced speed drive is established between said shafts, a one to one drive power train between said shafts being established when both said clutches are engaged, and a second brake for said second sun gear whereby said second sun gear may be caused to serve as a reaction member for said planetary gear set to establish an overdrive power train between said shafts when said second clutch is engaged.

8. In a transmission, the combination of a drive shaft, a driven shaft, a planetary gear set comprising a sun gear, a first planet gear in mesh with said sun gear, a ring gear connected with said driven shaft, a second planet gear in mesh with said first planet gear and with said ring gear, a second sun gear, a third planet gear in mesh with said first planet gear and with said second sun gear, a carrier for said planet gears, a friction brake for causing said first sun gear to serve as a reaction member and a friction clutch for connecting said drive shaft and said second sun gear whereby a low speed forward drive between said shafts may be established, a second friction clutch for connecting said planet gear carrier and said drive shaft whereby when said friction brake is engaged a higher reduced speed power train is established, a one to one drive between said shafts being established when said clutches are both engaged, a second friction brake for said second sun gear whereby when said second clutch is engaged, an overdrive ratio between said shafts is established, and a brake for said planetary gear carrier whereby the carrier may be caused to serve as the reaction member so that when said first clutch is engaged, a reverse drive is established between said shafts.

CLIFFORD L. SWIFT.

REFERENCES CITED

The following references are of record in the file of this patent:

UNITED STATES PATENTS

| Number | Name | Date |
| --- | --- | --- |
| 2,088,782 | Ford et al. | Aug. 3, 1937 |
| 2,124,192 | Hanson | July 19, 1938 |
| 2,150,950 | Thoma | Mar. 21, 1939 |
| 2,220,174 | Ravigneaux | Nov. 15, 1940 |
| 2,257,333 | Cotterman | Sept. 30, 1941 |

FOREIGN PATENTS

| Number | Country | Date |
| --- | --- | --- |
| 9,489 | Great Britain | May 1, 1908 |